(12) United States Patent
Thiesen et al.

(10) Patent No.: US 7,082,819 B2
(45) Date of Patent: Aug. 1, 2006

(54) DOPPLER RADAR FOR DETECTING TIRE ABNORMALITIES

(75) Inventors: Jack Thiesen, Easley, SC (US); George Phillips O'Brien, Piedmont, SC (US)

(73) Assignee: Michelin Recherche et Technique S.A. (CH)

( * ) Notice: Subject to any disclaimer, the term of this patent is extended or adjusted under 35 U.S.C. 154(b) by 126 days.

(21) Appl. No.: 10/731,198

(22) Filed: Dec. 9, 2003

(65) Prior Publication Data

US 2005/0120787 A1   Jun. 9, 2005

(51) Int. Cl.
*B60C 23/02* (2006.01)

(52) U.S. Cl. .................... 73/146.5; 340/870.01
(58) Field of Classification Search ............ 73/146, 73/146.2, 146.3, 146.4, 146.5, 146.8; 340/58, 340/870.01
See application file for complete search history.

(56) References Cited

U.S. PATENT DOCUMENTS

| | | | | |
|---|---|---|---|---|
| 1,592,937 | A * | 7/1926 | Jammer | 331/76 |
| 3,919,882 | A | 11/1975 | Wells et al. | |
| 4,450,431 | A * | 5/1984 | Hochstein | 340/447 |
| 4,570,152 | A | 2/1986 | Melton et al. | |
| 4,609,905 | A * | 9/1986 | Uzzo | 340/447 |
| 5,436,612 | A | 7/1995 | Aduddell | |
| 5,569,848 | A * | 10/1996 | Sharp | 73/146.2 |
| 5,837,897 | A * | 11/1998 | Jones et al. | 73/599 |
| 6,028,508 | A | 2/2000 | Mason | |
| 6,255,940 | B1 | 7/2001 | Phelan et al. | |
| 2002/0189336 | A1 * | 12/2002 | McEwan | 73/146 |
| 2003/0080852 | A1 * | 5/2003 | Harris | 340/5.54 |
| 2003/0214419 | A1 * | 11/2003 | Reindl | 340/870.01 |
| 2004/0154715 | A1 * | 8/2004 | Dufournier | 152/154.2 |
| 2004/0168512 | A1 * | 9/2004 | McEwan | 73/146 |

FOREIGN PATENT DOCUMENTS

DE   10119352 C1   11/2002

OTHER PUBLICATIONS

Stephen Azevedo and Thomas E. McEwan, "*Micropower Impulse Radar*" pp. 16-29 of *Science & Technology Review* Jan./Feb. 1996.

* cited by examiner

*Primary Examiner*—Edward Lefkowitz
*Assistant Examiner*—Andre Allen
(74) *Attorney, Agent, or Firm*—Dority & Manning, P.A.

(57) ABSTRACT

The present subject matter generally concerns the detection of tire related anomalies in a pneumatic tire using Doppler Micro-Power Impulse Radar technology together with radar signal analyzation methodologies. More particularly, the present disclosure relates to methods and apparatus for the detection of anomalies in pneumatic tires including tread separation, tread wear, uneven tread wear, tire balance and foreign body detection. The signal analysis used differentiates various of the detectable anomalies by analyzing the radar signals based on ranges of harmonics.

19 Claims, 4 Drawing Sheets

DOPPLER RADAR FOR DETECTING TIRE ABNORMALITIES

BACKGROUND OF THE INVENTION

The present subject matter generally concerns the detection of anomalies in and/or properties relating to a pneumatic tire using Doppler radar technology. More particularly, the present disclosure relates to methods and apparatus for the detection of anomalies in pneumatic tires including, but not limited to, tread separation, tread wear, uneven tread wear, tire balance and foreign body detection using Doppler Micro-Power Impulse Radar (MIR).

Tread belt separation in pneumatic tires is a known, and potentially dangerous, problem. Tires that are under-inflated, overloaded, and driven in hot climates can undergo tread belt separation. Tread belt separation may also be associated with improperly manufactured, or improperly re-manufactured, (i.e., so called, re-capped) tires. Tread belt separation can have significantly negative results on the vehicle operation should, the tread separate from a pneumatic tire while in service and at highway speeds. The present technology describes apparatus and methodology for detecting this and other conditions so that the driver can be alerted to these conditions.

Previous efforts have been made to monitor tires during use in an effort to detect actual or imminent failure and to warn drivers of such actual or imminent failure so that cautionary measures may be taken. One such effort is described in U.S. Pat. No. 5,436,612 (Aduddell) and involves the placement of plural microphones and radio transmitters at various locations on a truck. The transmitters broadcast sounds detected by the various microphones to a receiver positioned with the driver. In this way a driver could listen for any anomalous sound and, if heard, take appropriate measures.

U.S. Pat. No. 6,255,940 (Phelan et al.) describes a patch that may be installed inside a tire by attachment to the innerliner of the tire. The patch supports sensors that monitor tire temperature and pressure. A warning may be given to the vehicle driver upon sensing abnormal conditions. Another tire temperature monitoring technique is disclosed in U.S. Pat. No. 4,570,152 (Melton et al.). In this patent, a number of permanent magnets are implanted into the tire body. Excess heat generated from the running of the tire will cause variations in the magnetic field of the permanent magnets. These variations are detected and used to generate a warning to the vehicle driver.

Yet another previously known technique for monitoring tires and, in particular, used for monitoring for tread separation is taught by U.S. Pat. No. 6,028,508 (Mason). Mason '508 discloses a system employing a ranging system wherein a sensor using a transmitter and receiver combination is employed to detect the distance from the sensor to the surface of a tire being monitored. The arrangement is such that an alarm is issued if the distance from the sensor to the surface of the tire exceeded a predetermined amount.

Yet another previously know technique for monitoring pneumatic tires is taught in U.S. patent application Publication US 2002/0189336 A1 (McEwan). McEwan discloses placement of radar sensors at various positions relative to a pneumatic tire to monitor for different types of tire anomalies. McEwan, for example, discloses detection of tread loss by positioning a radar unit to illuminate a tangential portion of the tire tread such that, upon loss of tread, there would be a substantial, detectable reduction in returned radar signal. McEwan also discloses detection of foreign bodies penetrating the tire tread by positioning the radar unit to illuminate a tangential portion of the tire and examining radar return signals by comparing the average amplitude to a peak amplitude. Other tire related properties or anomalies are detected by positioning the radar unit variously, for example, side wall properties my be examined by positioning the radar unit to illuminate the side wall and speed of rotation may be examined by positioning the radar unit to illuminate, for example, spokes or openings in the wheel on which a tire may be mounted.

While various aspects and alternative features are known in the field of tire failure and protection technology, no one design has emerged that generally integrates all of the ideal features and performance characteristics as discussed herein.

An exemplary background reference in addition to those already cited in the specification includes the January/February 1996 publication by Science & Technology Review entitled "Micropower Impulse Radar." The disclosures of all the foregoing United States patents are hereby fully incorporated into this application by reference thereto.

SUMMARY OF THE INVENTION

The present subject matter recognizes and addresses various of the foregoing shortcomings, and others concerning certain aspects of tire failure and protection technology and, in particular, tire anomaly detection. Thus, broadly speaking, aspects of some embodiments of the presently disclosed technology concern the provision of improved apparatus and corresponding methodology for the detection of tire anomalies. More particularly, certain aspects of some embodiments of the disclosed technology relate to an improved apparatus and corresponding methodology using MIR technology to provide an indication and measurement of tire anomalies.

Another aspect of certain embodiments of the present subject matter is to provide an improved apparatus and corresponding methodology for the detection of the onset of tire tread separation as well as other tire related anomalies including, but not limited to, tread wear, uneven tread wear, tire balance and alignment, and the impalement of foreign objects into the tire.

A further aspect of some embodiments of the present subject matter is to provide an improved apparatus and corresponding methodology for the detection of tire related anomalies that does not require any special features of the tire itself as in the implanted magnets of the previously mentioned Melton et al. '152 Patent or the pad mounted sensor of the previously mentioned Phelan et al. '940 Patent.

A still further aspect of some embodiments of the presently disclosed technology is to provide an improved apparatus and corresponding methodology for the detection of tire related anomalies that may be employed with any pneumatic tire without the need to provide additional tire mounted sensors.

Yet a further aspect of some of the embodiments of the presently disclosed technology is to provide an improved apparatus and corresponding methodology for the detection of a plurality of tire related properties and anomalies using a single, fixed sensor.

Additional aspects and advantages of the invention are set forth in, or will be apparent to those of ordinary skill in the art from, the detailed description herein. Also, it should be further appreciated by those of ordinary skill in the art that modifications and variations to the specifically illustrated, referenced, and discussed features and steps hereof may be practiced in various embodiments and uses of this invention without departing from the spirit and scope thereof, by virtue of present reference thereto. Such variations may include, but are not limited to, substitution of equivalent means and features, materials, or steps for those shown, referenced, or discussed, and the functional, operational, or positional reversal of various parts, features, steps, or the like.

Still further, it is to be understood that different embodiments, as well as different presently preferred embodiments, of this invention may include various combinations or configurations of presently disclosed features, steps, or elements, or their equivalents (including combinations of features or steps or configurations thereof not expressly shown in the figures or stated in the detailed description).

A first exemplary embodiment of the present subject matter relates to an improved apparatus and corresponding methodology for the detection of tire related anomalies using MIR technology to examine the tread surface and underlying layers of a vehicle mounted pneumatic tire.

A more particular exemplary embodiment of the present technology relates to an improved apparatus and corresponding methodology for the detection of the onset of tread separation as well as other tire related anomalies in a pneumatic tire using a Doppler radar system together with appropriate signal processing systems and methodologies.

Additional embodiments of the subject technology, not necessarily expressed in this summarized section, may include and incorporate various combinations of aspects of features, parts, or steps referenced in the summarized objectives above, and/or features, parts, or steps as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present invention, including the best mode thereof, directed to one of ordinary skill in the art, is set forth in the specification, which makes reference to the appended figures, in which.

Figure 1:
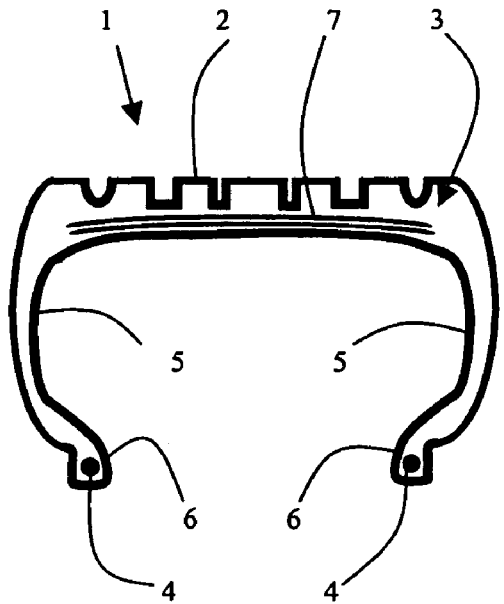
FIG. 1 displays a cross sectional view of an exemplary pneumatic tire and illustrates a possible tread separation zone.

Repeat use of reference characters throughout the present specification and appended drawings is intended to represent same or analogous features or elements of the invention.

DETAILED DESCRIPTION OF THE DRAWINGS

As referenced in the Summary of the Invention section, supra, the present subject matter is directed towards an improved apparatus and corresponding methodology for the detection of tire related anomalies in a pneumatic tire using a Doppler radar system together with appropriate signal processing systems and methodologies.

FIG. 1 illustrates an exemplary cross sectional view of a pneumatic tire 1. Pneumatic tire 1 consists of a tread block section 2, sidewall sections 5, bead sections 6, beads 4, and a belt section 7. Also illustrated in FIG. 1 is a general area 3 in which tread separation may occur, as will be more thoroughly discussed later.

Figure 2:
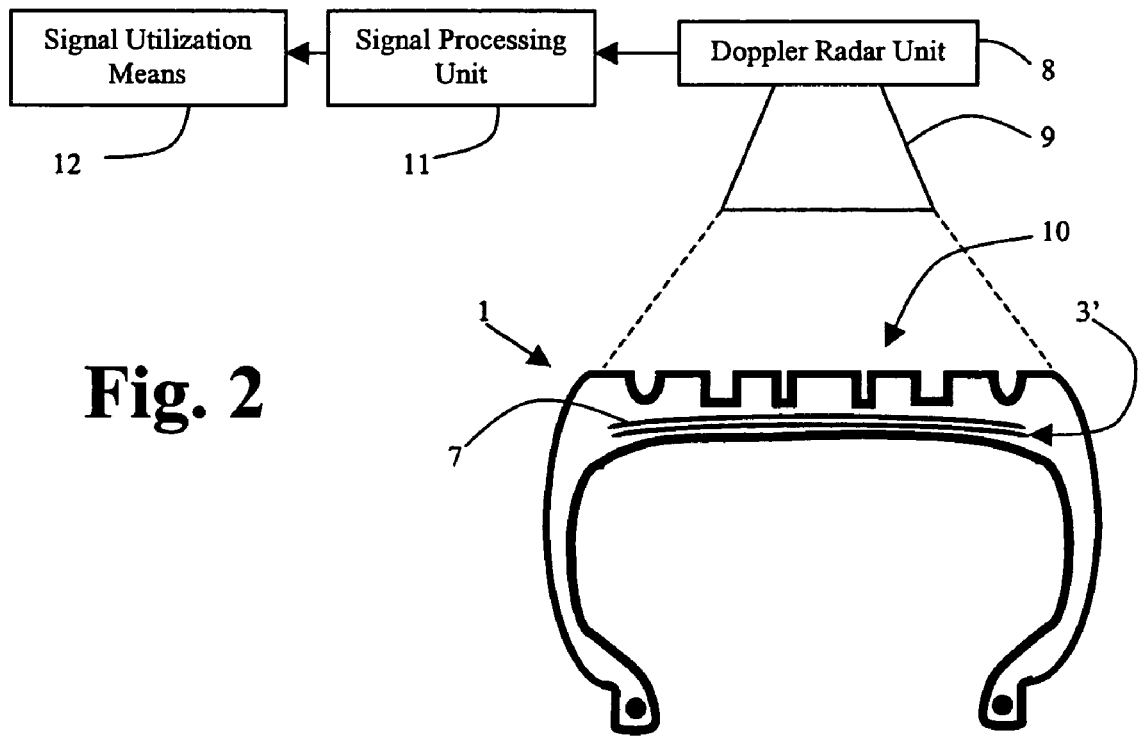
FIG. 2 displays a similar cross sectional view of a pneumatic tire illustrating a belt separation zone together with detection apparatus in accordance with the present technology.

FIG. 2 illustrates another exemplary cross sectional view of a pneumatic tire 1. The tire 1 illustrated in FIG. 2 includes all of the components of the tire 1 illustrated in FIG. 1 but emphasis is made on the illustration of a slightly different section 3' of the tire where belt separation may occur. Also illustrated in FIG. 2 is an exemplary representation of apparatus in accordance with the present technology for detecting anomalies within the tire 1. As illustrated, there is shown a Doppler Radar Unit consisting of a Micro-Power Impulse Radar (MIR) transceiver unit 8 and a directional antenna 9. Electrical signals from the MIR 8 are coupled to a signal processing unit 11 and from the signal processing unit 11 to a signal utilization means 12, both of which will be subsequently explained in further detail.

As illustrated in FIG. 2, the antenna 9 of the Doppler radar unit 8 is directed toward and, in operation, illuminates an exterior tread block area 10 of the tire 1. The Doppler radar unit 8 and the signal processing unit 11 function together to detect the rapid change in speed of the tire surface or the subsurface tread belt, as they approach the Doppler radar unit 8. The electrical signals produced by the Doppler radar unit 8 are proportional to the radial velocity of the tire surface and of the tread belts below the tire surface.

In order to further explain the operation of the present technology, a brief explanation of the concept of "tread belt separation" is appropriate. Tread belt separation as a phenomenon has to do with the separation of the steel belts from the tread package of a pneumatic tire. Tread belt separation begins at initiation points were the rubber to metal bonds are weak and then tear. These initiation points grow as the tire rubber ages and as flexing causes localized heating. The growth of the initiation points is associated with the formation of pockets. As tread belt separation progresses these pockets grow and coalesce. Tread belt separation can be measured using a technique known as shearography. One exemplary shearographic technique used to measure tread belt separation in pneumatic tires involves placing tires to be tested in a pressure chamber. The tire being tested is imaged at normal pressure using, e.g., a CCD-video camera and the image is stored in a memory. Afterwards air is removed from the chamber and the tire being tested is re-imaged. Air pockets within the tire, i.e., sites exhibiting tread belt separation, will expand due to the reduction of air pressure on the outside surfaces of the tire and will cause the tire to deform. Images taken in the deformed state of the tire are electronically subtracted from the stored images and the resulting difference images are displayed. These displayed images are displayed as interference fringes on a monitor and, thereby, reveal instances of tread belt separation in the tire. As is apparent, such a test method, while effective, would be totally unsuitable for use on a moving vehicle, but it does offer a useful, non-destructive technique for comparison/confirmation of tread belt separation detection as disclosed by the present technology.

Figure 3:
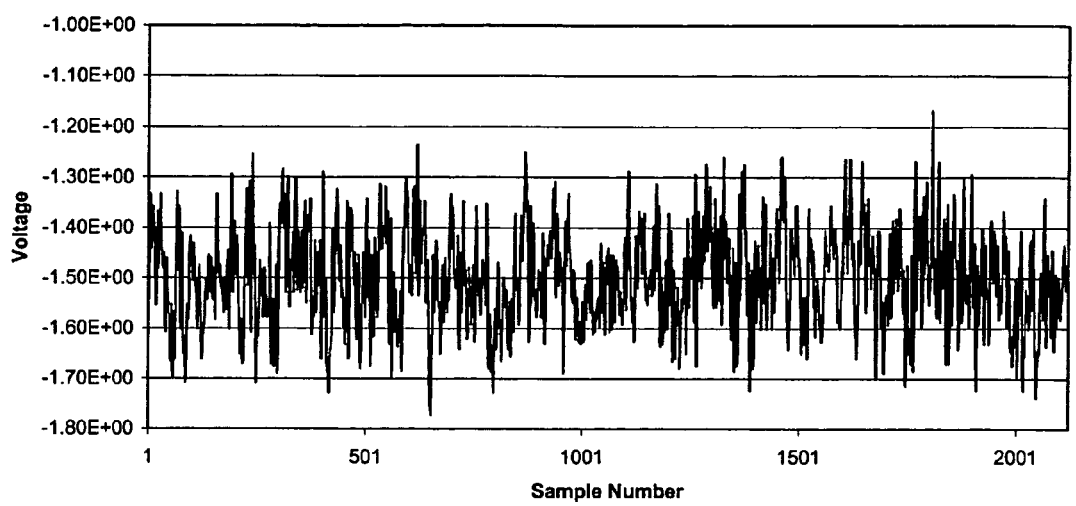
FIG. 3 displays a graph representing exemplary output voltage data of a Doppler Micro-Power Impulse Radar device.
Figure 4:
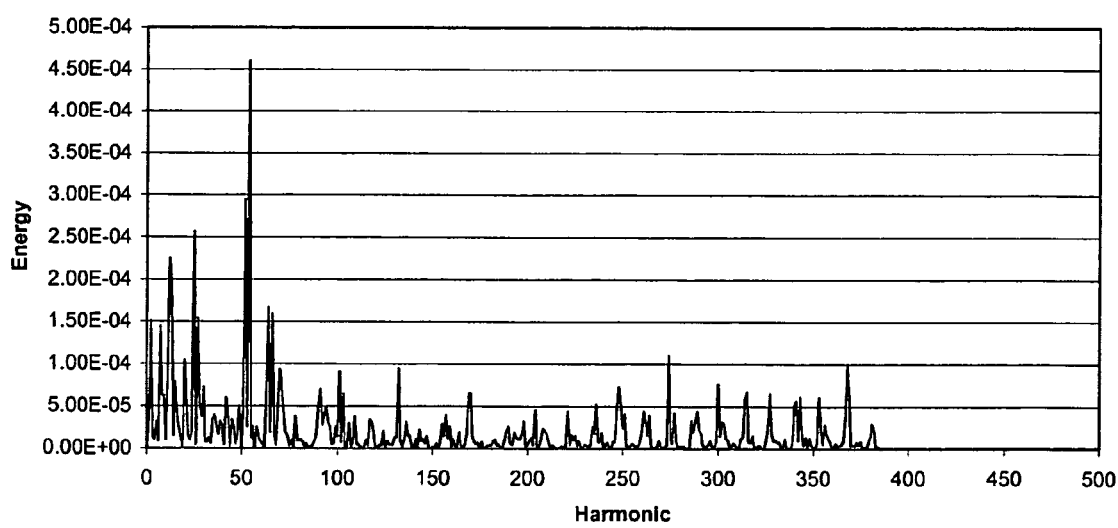
FIG. 4 displays an exemplary harmonics analysis graph based on the data from the graph of FIG. 3.

The present technology, as previously mentioned, incorporates the use of a Doppler Micro-Power Impulse Radar (MIR) transceiver unit 8 to detect the onset of tread belt separation. Particular examples of Doppler MIR for use in accordance with the presently disclosed technology includes Doppler radar transceiver units as described in the aforementioned McEwan Patent Application Publication or any other commercially available products. As earlier noted, the present technology makes use of a signal processor to process or analyze signals generated by an MIR device to detect the onset of tread belt separation and other tire related anomalies. To illustrate this concept, attention is directed to FIG. 3 that shows an exemplary graph of the output voltage data from a MIR over one revolution of a test tire. This particular test tire had no apparent tread belt separation as measured by shearography using a technique similar to that previously described. In order to determine the presence of tread belt separation in the tire under test using the techniques in accordance with the present technology, data as illustrated in FIG. 3 is analyzed using harmonic analysis with the Discrete Fourier Transform (DFT). To do this, the number of samples corresponding to a given rotation must be known. With reference to FIGS. 3 and 4, with a known sampling frequency, e.g., 40 kilosamples/second, the number of samples in the rotation may be obtained and a standard Discrete Fourier Transform, DFT, analysis may be used. The results of such a process may be plotted and would appear as shown in FIG. 4. "Energy" is represented in FIG. 4, as the square of the voltage signal obtained from the MIR and is represented in arbitrary units. Thus, FIG. 4 represents a comparison of "energy" (in arbitrary units) vs. harmonics based on the rotational speed of the tire under test.

Figure 5:
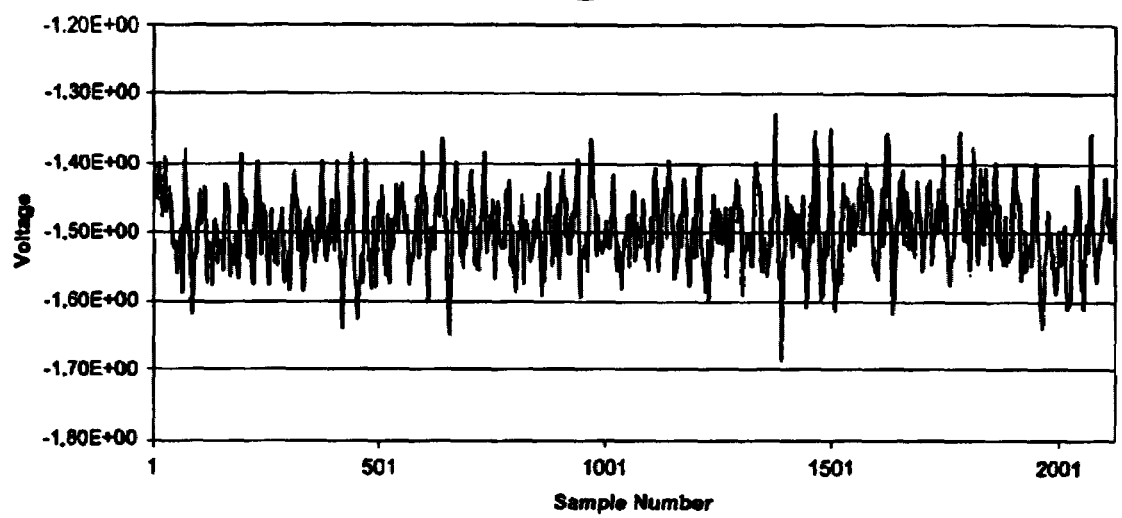
FIG. 5 displays an exemplary graph representing the output voltage data of a Doppler Micro-Power Impulse Radar device averaged over 15 tire revolutions.
Figure 6:
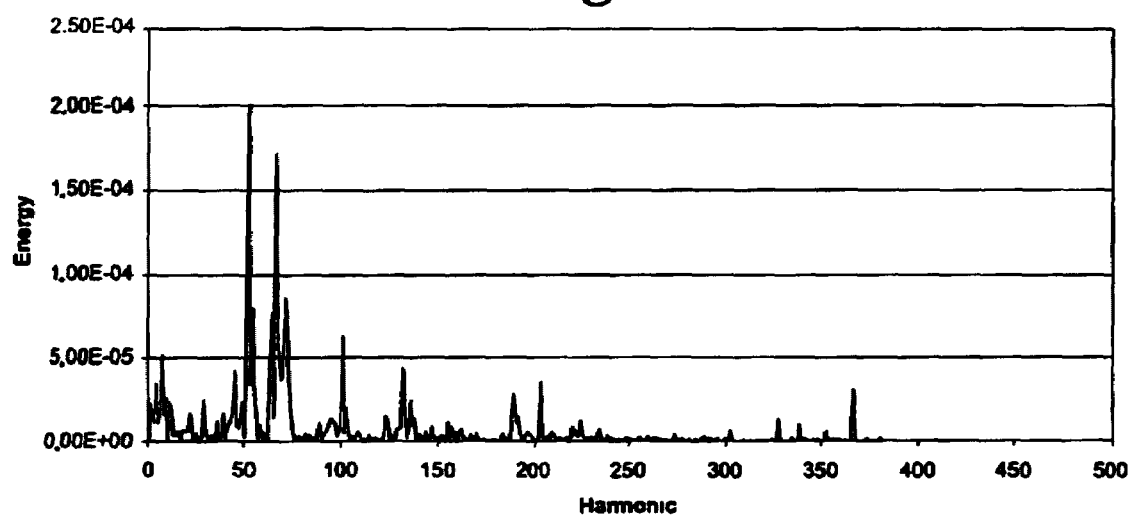
FIG. 6 displays an exemplary harmonics analysis graph based on the data from the graph of FIG. 5.

FIGS. 5 and 6 represent a similar analysis wherein the data shown in FIG. 5 is a representation of the average of 15 revolutions of the tire under test and the graph of FIG. 6 represents the results of an analysis like that represented in FIG. 4 but using the data from FIG. 5.

To identify tread belt separation and other tire anomalies from the derived energy spectra as shown in FIG. 4 and 6, the following technique may be employed. First the average energy of the harmonic energy spectra $E_{av}$ may be computed using the following:

$$E_{av} = \frac{\sum_{i=1}^{N} E_i}{N} \qquad \text{Eq. 1}$$

and the center of mass, CM, of the harmonic distribution may be calculated as:

$$CM = \frac{\sum_{i=1}^{N} iE_i}{\sum_{i=1}^{N} E_i} \qquad \text{Eq. 2}$$

where $E_i$ is the $i^{th}$ energy component of the harmonic spectra and N is the number of samples.

Figure 7:
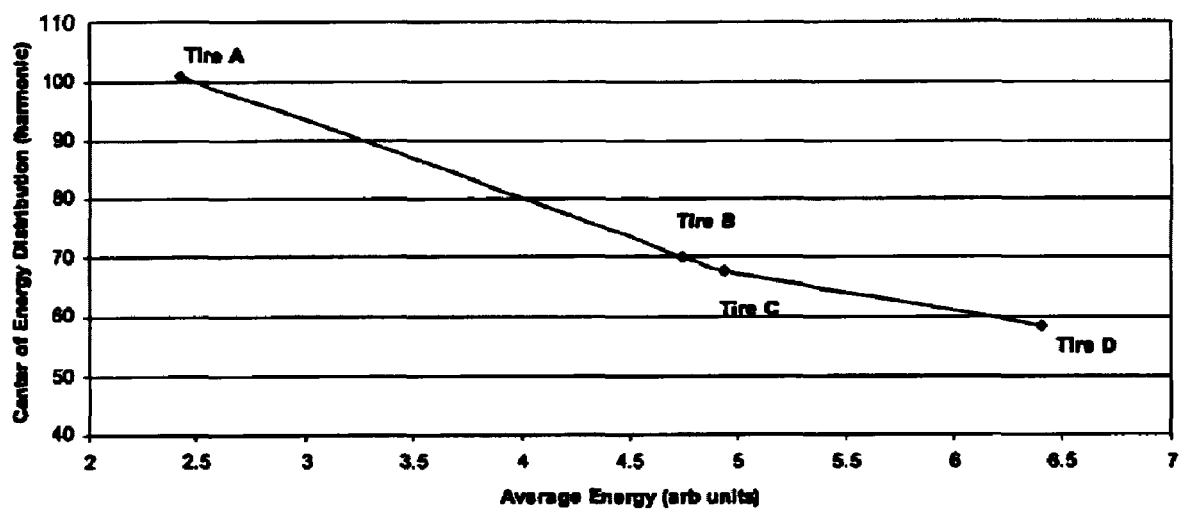
FIG. 7 represents the results of an exemplary analysis useful in explaining the effectiveness of the present methodology.

One expects an increase in the value computed from Equation 1 and a decrease in the value computed in Equation 2. To test these expectations, several tires (Tires A–D) with varying amounts of tread belt separation, as determined by shearography, were tested. FIG. 7 illustrates a plot of the center of mass of the energy distribution versus the average energy (arbitrary units) in the harmonic distribution for these tires. Tire A had the least amount of tread belt separation and tire D had the most tread belt separation. The utility of using these two values as opposed to more specialized algorithms focused on specific harmonics, is that the CM and $E_{av}$ are concerned with the general behavior of all tires experiencing tread belt separation rather than values that might change substantially with tire type, dimension, or even test conditions. Several further modifications may be made to the basic test algorithm. The first modification has to do with reducing the measurement from the two-dimensional representation seen in FIG. 7 to a one-dimensional gauge. One method for doing this is to use the ratio:

$$G = \frac{CM}{E_{av}} \qquad \text{Eq. 3}$$

Since there will be no apriori knowledge of the value that a tire should give when the energy content is determined and equation 3 is applied, equation 3 should be normalized using the initial value measured. In case of multiple tire tests, G may be measured for tire A and then used as a normalization factor, $G_0$, for tires, B, C, and D. For tread belt separation evolution tests, the initial value of the new tires may be measured and this value used as normalization for all subsequent measurements. That is, the $j^{th}$ gauge reading is:

$$G_j = \frac{CM_j}{G_0 E_{Avj}} \qquad \text{Eq. 4}$$

where $G_0$ is the initial gauge reading. In most cases the first gauge reading would be that which represents the tire in its ideal state and to which all subsequent states are referenced. Using normalization accomplishes two things: First it removes variations in radar power and location from having to be considered when measuring for tread belt separation or other tire anomalies with the Doppler Micro-Power Impulse Radar (MIR). Second, it removes the need for specialized knowledge about the specific tire under test, i.e. what is the energy level and CM for a specific tread package as well as possible vehicle effects.

Another modification that may be made to the basic measurement relates to stabilization of the time base and improved averaging. There is a significant amount of noise generated by motion of a vehicle over a less than perfectly smooth road. This noise may arise from multiple sources including the on-vehicle mounting location for the MIR and the relatively independent motion of the vehicle's tires. This relative motion thus creates a certain amount of movement over time which would produce voltage noise in any Doppler based system. The presence of large amplitude noise requires that filtering of the sampled signal be undertaken. In the most basic of filtering methodologies, simple time based averaging of the signal may be applied as, e.g., was performed in collecting the data illustrated in FIGS. 5 and 6, however, to do averaging over a large number of samples requires a stable time base.

During the course of evaluating various indications of tread belt separation, a number of tests were performed. One of these tests involved a study of tread belt separation evolution where it was attempted to identify tread belt separation as it formed in tires that were initially new. During the course of the tread belt separation evolution test, it was determined that there were several other effects that could confound the tread belt separation measurement. The first of these was uneven wear. During tread belt separation evolution testing, one of the tires under test began to develop substantial amounts of uneven wear, but no tread belt separation. It was noted that using the same gauge technique developed for tread belt separation that the evolution of uneven wear had substantial similarities to tread belt separation. On the other hand, it was noted that as uneven wear became more developed, the center of mass (CM) of the harmonic distribution did not change as rapidly as the average energy. This suggested modification of the gauge equation, Eq. 3, to:

$$G = \frac{CM}{\sqrt{E_{av}}} \qquad \text{Eq. 5}$$

Indeed reducing the effects of the average energy on the gauge value did seem to mitigate gauge sensitivity to uneven wear. Upon further testing it was discovered that not only was the tread belt separation detector sensitive to uneven wear but also it was very sensitive to tread wear. While it can be considered advantageous to be able to measure tread wear, this points out a possible problem with the tread belt separation measurement. Since the gauge relies upon an increase in average energy and the shift in the harmonic CM, an injudicious choice of harmonics to analyze could lead to an inaccurate indication of tread belt separation.

The effects pointed out demonstrate the need for windowing, where windowing means performing analysis for the varied phenomena of interest by selecting ranges of harmonics to study. For example, tread belt separation and uneven wear could be measured by studying harmonics ranging from the $3^{rd}$ harmonic to the $n^{th}$ harmonic, where n is the fundamental harmonic related to the tread pattern, using methods described above. Tread wear could be studied in the tires under study by choosing the harmonics from the $n^{th}$ harmonic to the $m^{th}$ harmonic, where m is the upper overtone of the tread pattern energy, and measuring the average energy. Balance and alignment could be studied by observing harmonics 1 and 2. In an exemplary embodiment, n may be the $60^{th}$ harmonic while m may be the $120^{th}$ harmonic. This ability to identify tread belt separation, or other tire anomalies, using a windowed approach based on ranges of harmonics leads to the suggestion of a piecewise functional dependency such as:

$$G_j = \begin{cases} \frac{f(CM_j)}{G_0 g(E_{Avj})} & \text{for } CM_0/a < CM_j \leq CM_0 \\ \frac{l(CM_j)}{G_0 m(E_{Avj})} & \text{for } CM_j < CM_0/a \end{cases} \qquad \text{Eq. 6}$$

Where $f(CM_j)$, $g(E_{avj})$, $l(CM_j)$, and $m(E_{avj})$, are empirically determined functions which provide an adequate gauge and can be empirically determined weighting functions to provide adequate sensitivity to the phenomena under study. In Equation 6, a is a real value constant chosen appropriately to correctly partition the behavior, since it is observed that for different values of the center of mass one can expect differences in the evolution of various phenomena. The piecewise function defined in Equation 6 provides a template for a large number of functions that can be used to measure tread belt separation, tread wear, and uneven wear and do so with adequate discrimination.

Thus there has been described an apparatus and methodology for detecting tire related anomalies and, in particular, an apparatus and methodology using a Micro-Power Impulse Radar and signal analyzation techniques involving ranges of harmonics as a basis on which to detect particular types of anomalies or defects in tires. Multiple advantages in the use of the present technology may be seen from the simplicity of the actual hardware employed to the fact that no specialized add-ons as internal patches or other sensors are required but rather the monitoring technique can be applied to any pneumatic tire without modification of the tire itself. Although no specialized add-ons are required, use of the presently disclosed technology with additional tire hardware should not be precluded.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire monitoring apparatus comprising:
    a radar transceiver having an output, the radar transceiver positioned to illuminate a portion of a tire with RF signals and to receive reflected signals from the tire and configured to produce an output signal at the output thereof; and
    a signal processor having an input coupled to the output of the radar transceiver and an output;
    wherein the processor is configured to perform a signal analysis based on selected harmonics of the reflected signals received by the radar transceiver and to produce an output signal at the output thereof indicative of selected tire related parameters or anomalies.

2. A tire monitoring apparatus as in claim 1 wherein, the processor is configured to perform a signal analysis based on a selected range of harmonics of the reflected signals received by the radar transceiver.

3. A tire monitoring apparatus as in claim 2 wherein, the signal processor is configured to perform a signal analysis based on the average energy of the harmonic energy within the selected range of harmonics.

4. A tire monitoring apparatus as in claim 2 wherein, the signal processor is configured to perform a signal analysis based on the center of mass of the harmonic distribution within the selected range of harmonics.

5. A tire monitoring apparatus as in claim 3 wherein, the signal processor is configured to perform a signal analysis based on the center of mass of the harmonic distribution within the selected range of harmonics.

6. A tire monitoring apparatus as in claim 2 wherein, the range of harmonics is selected based on selected tire related parameters or anomalies.

7. A tire monitoring apparatus as in claim 6 wherein, the tire related parameters or anomalies are balance and alignment and the selected range of harmonics is the range from the $1^{st}$ to the $2^{nd}$ harmonic.

8. A tire monitoring apparatus as in claim 6 wherein, the tire related parameters or anomalies are tread belt separation and uneven tread wear and the selected range of harmonics is the range from the $3^{rd}$ to the $n^{th}$ harmonic, where n is the fundamental harmonic related to the tread pattern.

9. A tire monitoring apparatus as in claim 6 wherein, the tire related parameter or anomaly is tread wear and the selected range of harmonics is the range from the $n^{th}$ to the $m^{th}$ harmonic, where n is the fundamental harmonic related to the tread pattern and m is the upper overtone of the tread pattern energy.

10. A tire monitoring apparatus as in claim 1 wherein, the radar transceiver is a Doppler radar transceiver.

11. A tire monitoring apparatus as in claim 10 wherein, the radar transceiver is a Doppler micro-power impulse radar transceiver.

12. A method for detecting tire related parameters comprising the steps of:
    illuminating a portion of a tire with RF signals;
    receiving signals reflected from the illuminated tire;
    selecting a range of harmonics of the reflected signals for analysis; and
    analyzing the selected range of harmonics to detect selected tire related parameters.

13. The method of claim 12 wherein, the step of analyzing the selected range of harmonics comprises evaluating the average energy of the harmonic energy within the selected range of harmonics.

14. The method of claim 13 wherein, the step of analyzing the selected range of harmonics comprises evaluating the center of mass of the harmonic distribution within the selected range of harmonics.

15. The method of claim 12 wherein, the step of analyzing the selected range of harmonics comprises evaluating the center of mass of the harmonic distribution within the selected range of harmonics.

16. The method of claim 12 wherein, the step of selecting a range of harmonics is performed based on the tire related parameters to be detected.

17. The method of claim 16 wherein, the selected tire related parameters are balance and alignment and the selected range of harmonics is the range between the $1^{st}$ and $2^{nd}$ harmonic.

18. The method of claim 16 wherein, the selected tire related parameters are tread belt separation and uneven tread wear and the selected range of harmonics is the range from the $3^{rd}$ to the $n^{th}$ harmonic, where n is the fundamental harmonic related to the tread pattern.

19. The method of claim 16 wherein, the selected tire related parameter is tread wear and the selected range of harmonics is the range from the $n^{th}$ to the $m^{th}$ harmonic, where n is the fundamental harmonic related to the tread pattern and m is the upper overtone of the tread pattern energy.

* * * * *